No. 836,450. PATENTED NOV. 20, 1906.
F. MESINGER.
TIRE.
APPLICATION FILED DEC. 18, 1905.
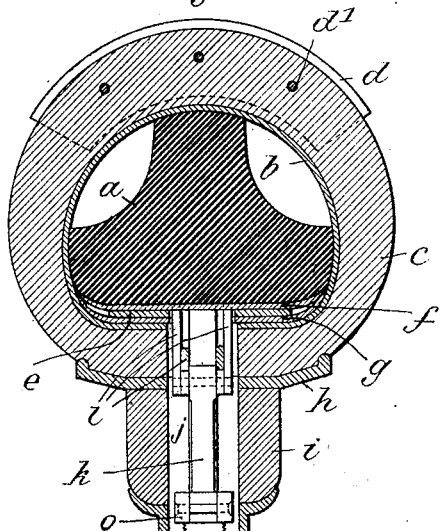
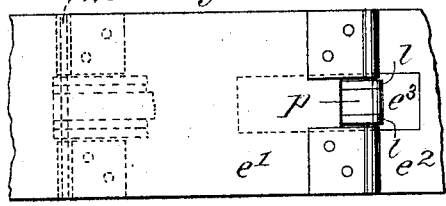
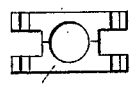
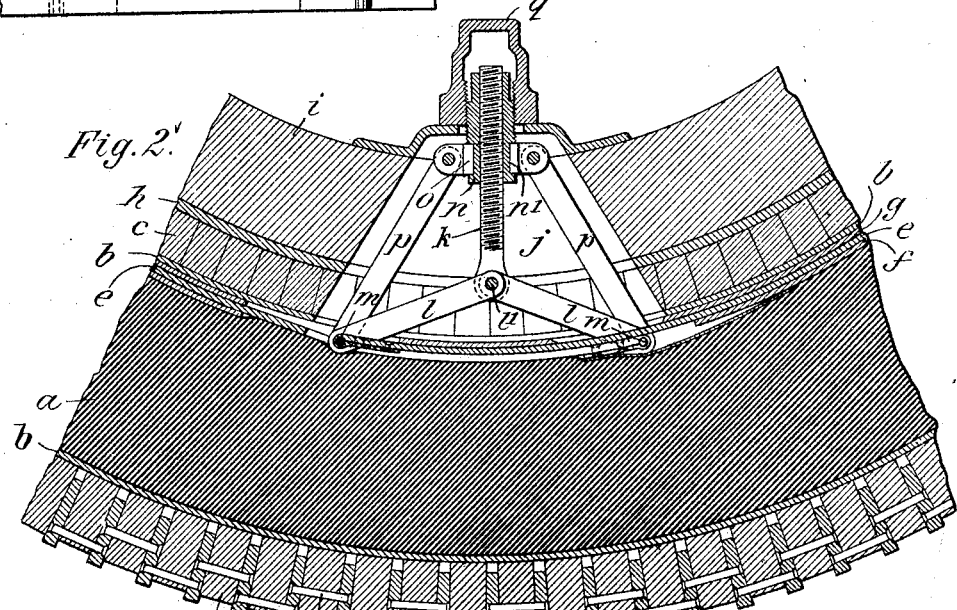
Witnesses: Inventor
Frederick Mesinger

UNITED STATES PATENT OFFICE.

FREDERICK MESINGER, OF NEW YORK, N. Y.

TIRE.

No. 836,450.　　　Specification of Letters Patent.　　　Patented Nov. 20, 1906.

Application filed December 18, 1905. Serial No. 292,217.

*To all whom it may concern:*

Be it known that I, FREDERICK MESINGER, a citizen of the United States, residing at New York city, Bronx, county and State of New York, have invented new and useful Improvements in Tires, of which the following is a specification.

This invention relates to a tire which is of simple construction, possesses superior wearing qualities, and may be securely fastened to the wheel.

In the accompanying drawings, Figure 1 is a cross-section of my improved tire; Fig. 2, a longitudinal section of part thereof; Fig. 3, a detail of the overlapping ends of the binding-strap, and Fig. 4 a detail of the collar.

The tire may be provided either with a hollow pneumatic core-tube or with the solid grooved core $a$ shown in the drawings. The core is surrounded by a tube $b$, which in turn is embraced by a series of leather rings $c$. Between the outer or working faces of rings $c$ are interposed curved metal plates $d$, which project beyond rings $c$ and constitute runners. These runners are secured to the rings $c$ by rivets $d'$, as shown in Figs. 1 and 2. Between core $a$ and tube $b$ is interposed a flexible metal strap $e$, flanked by outer and inner leather strips $f$ and $g$. The tire is seated upon a flanged metal rim $h$, fitted on the felly $i$ of the wheel.

The strap $e$ constitutes the means for clamping the tire to the wheel and has for this purpose overlapping disconnected ends $e'$ $e^2$, adapted to be drawn over each other to a greater or less extent, so as to thereby tighten or slacken the strap. The means for thus drawing the ends of the strap $e$ over each other are as follows:

The felly $i$, as well as rim $h$, is provided with a slot $j$, accommodating a screw $k$. The outer end of this screw is connected to the ends $e'$ $e^2$ of strap $e$ by toggle-links $l$. These links are pivoted to screw $k$ at $l'$ and to the ends of strap $e$ by pins $m$. Screw $k$ is engaged by a threaded sleeve $n$, grooved, as at $n'$, to seat a divided perforated collar $o$. This collar is connected to pins $m$, and consequently to the links $l$, by pivoted braces $p$. To accommodate those links $l$ and that brace $p$ which connect with the outer end $e'$ of strap $e$, the inner end $e^2$ of such strap is slotted, as at $e^3$. The sleeve $n$ projects beyond felly $i$ and its exposed end is normally concealed by a cap $q$.

After the tire has been slipped over the wheel the sleeve $n$ is turned to advance screw $k$, and thereby draw the ends $e'$ $e^2$ over each other to a greater extent. In this way the diameter of strap $e$ is reduced and the tire is securely clamped to the wheel. By turning the sleeve in the opposite direction the strap is slackened to permit the removal of the tire.

It will be seen that my improved tire possesses superior strength and wearing qualities, is held to the wheel with a uniform pressure, and may be quickly applied in a simple and reliable manner.

What I claim is—

1. A tire provided with a fastening-strap having overlapping ends, toggles secured thereto, a screw pivoted to the toggles, a sleeve engaging the screw, a collar mounted on the sleeve, and braces that connect the collar to the toggles, substantially as specified.

2. A tire provided with a core, a series of rings mounted thereon, and outwardly-projecting runners between the rings, substantially as specified.

3. A tire provided with a core, a series of rings mounted thereon, outwardly-projecting runners between the rings, a strap intermediate core and rings, and means for tightening the strap, substantially as specified.

Signed by me at New York city, (Manhattan,) New York, this 15th day of December, 1905.

FREDERICK MESINGER.

Witnesses:
WILLIAM SCHULZ,
FRANK V. BRIESEN.